United States Patent [19]

Melocik

[11] Patent Number: 4,659,970

[45] Date of Patent: Apr. 21, 1987

[54] VEHICLE DOCKING APPARATUS AND METHOD

[75] Inventor: Grant C. Melocik, Chardon, Ohio

[73] Assignee: Caterpillar Industrial Inc., Mentor, Ohio

[21] Appl. No.: 896,378

[22] Filed: Aug. 14, 1986

[51] Int. Cl.⁴ ............................................. H02P 3/04
[52] U.S. Cl. .................................. 318/269; 318/275; 318/139; 318/371; 318/372
[58] Field of Search ............... 318/269, 272, 273, 275, 318/277, 279, 587, 52, 139, 362, 363, 371, 372; 364/426; 180/65.1, 65.3, 65.5, 65.8

[56] References Cited

U.S. PATENT DOCUMENTS

| 3,715,642 | 2/1973 | Walter | 318/269 |
| 3,969,661 | 7/1976 | Morinaga et al. | 318/375 |
| 4,485,444 | 11/1984 | Maruyama et al. | 364/426 |

FOREIGN PATENT DOCUMENTS

| 58-175979 | 10/1983 | Japan | 318/371 |
| 59-47986 | 3/1984 | Japan | 318/362 |
| 60-139184 | 7/1985 | Japan | 318/363 |

Primary Examiner—William M. Shoop, Jr.
Assistant Examiner—Bentsu Ro
Attorney, Agent, or Firm—Stephen L. Noe

[57] ABSTRACT

Automatic guided vehicles are commonly used in industrial material handling operations. Such vehicles must be accurately docked at predetermined stop locations without the guidance or assistance of human operators. The subject apparatus is used in conjunction with a vehicle having a vehicle drive circuit for controllably propelling the vehicle at a velocity responsive to a velocity command signal. At least one ground engaging wheel is equipped with a vehicle brake for controllably stopping the vehicle in response to a brake actuation signal. A position determining element produces a controlled stop signal in response to the vehicle being positioned a predetermined distance from the desired stop location, and an absolute stop signal in response to the vehicle being positioned at the desired stop location. A logic control circuit receives the stop signals and produces a brake actuation signal having a value sufficient to partially engage the vehicle brake and a velocity command signal having a value sufficient to continue to propel the vehicle at a predetermined low velocity in response to receiving the controlled stop signal. The logic control circuit produces a velocity command signal having a minimum value in response to receiving the absolute stop signal.

5 Claims, 6 Drawing Figures

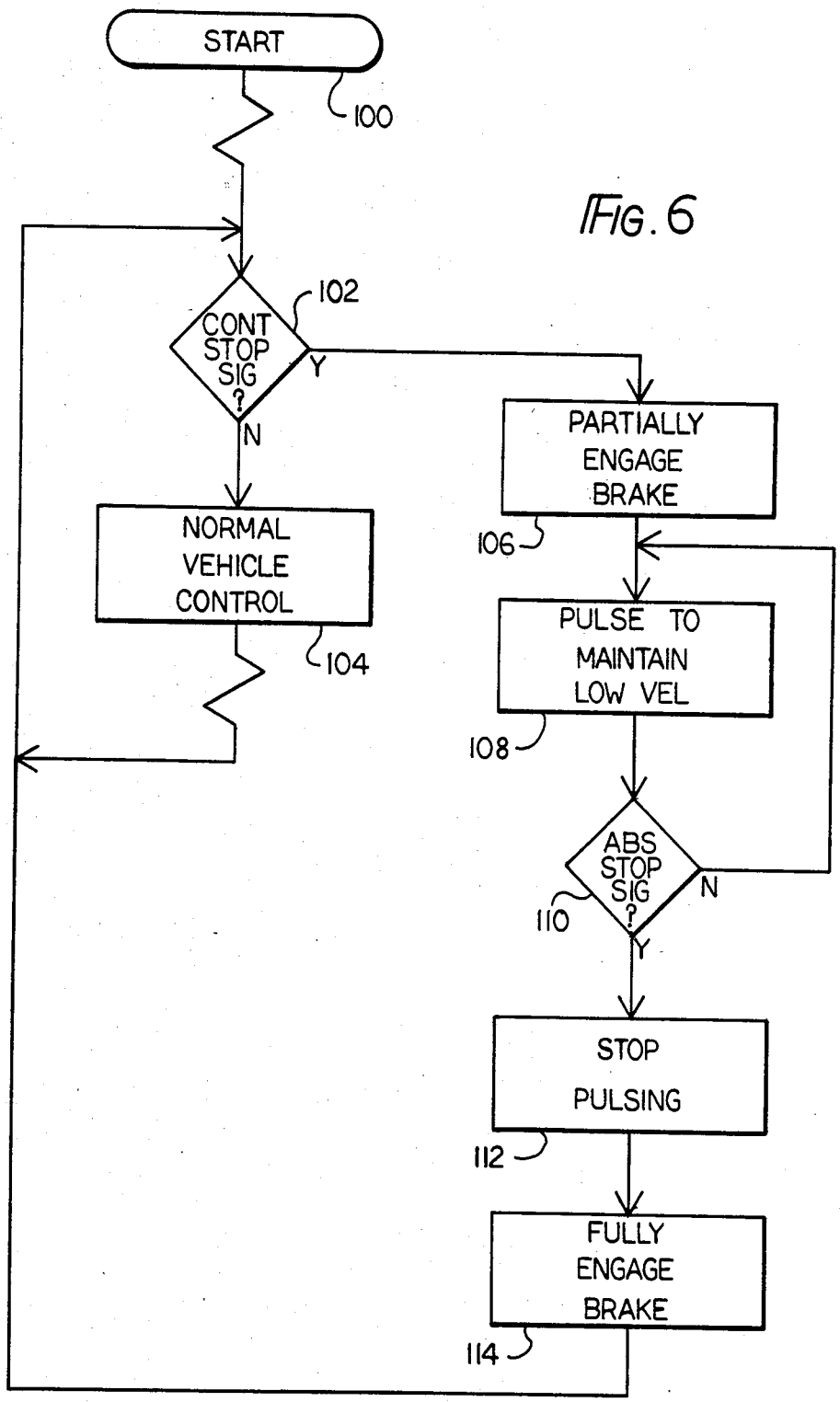

VEHICLE DOCKING APPARATUS AND METHOD

TECHNICAL FIELD

This invention relates generally to an apparatus and method for docking a vehicle and, more particularly, to an apparatus and method for controllably docking a vehicle at a predetermined location.

BACKGROUND ART

Material handling vehicles, such as industrial lift trucks, frequently must be docked at a particular location with respect to a loading/unloading station. In the case of operator controlled vehicles this merely requires ordinary skill on the part of the vehicle operator. However, in the case of operatorless automatic guided vehicles, the process involved in accurately docking the vehicle is considerably more complex.

In a typical situation, an automatic guided vehicle approaches a docking or stop location at a normal travel speed. Upon approaching the desired docking point, the vehicle automatically slows to a reduced approach speed. Finally, upon actually reaching the docking point, the vehicle is brought to a halt.

This seemingly simple procedure is complicated by various external factors. For example, common automatic guided vehicles utilize electrical braking as an energy efficient means for stopping the vehicle. Electrical braking, while effective as a means for slowing a vehicle over a relatively long period of time, is less than ideal for making instantaneous corrections in vehicle velocity when the vehicle is moving at a relatively slow speed. Electrical braking requires switching the direction contactors typically utilized in the control circuit of an electrical vehicle from forward to reverse configurations. The switching procedure requires a determinable amount of time that necessarily slows the response of the electrical braking.

Rapid response of the braking system is particularly necessary where the surface condition over which the vehicle must travel is rough or uneven. Since electrical braking requires considerable time to respond, such unevenness cannot be readily compensated for without some alternative means for stopping the vehicle. The selected compensation method must not inhibit travel of the vehicle up small rises in the travel surface, but must be capable of inhibiting gravity induced "coasting" down similar irregularities in the travel surface.

The present invention is directed to overcoming one or more of the problems as set forth above.

DISCLOSURE OF THE INVENTION

In one aspect of the present invention, an apparatus for controllably stopping a vehicle is provided. The vehicle includes a vehicle drive circuit for controllably propelling the vehicle at a velocity responsive to a velocity command signal, at least one ground engaging wheel equipped with a vehicle brake for controllably stopping the vehicle in response to a brake actuation signal, and a transducer for sensing the vehicle velocity and responsively producing an actual velocity signal. A logic control circuit produces the velocity command signal and the brake actuation signal in response to predetermined operating conditions of the vehicle. A position determining device produces a controlled stop signal in response to the vehicle being positioned a predetermined distance from a desired stop location, and an absolute stop signal in response to the vehicle being positioned at the desired stop location. The logic control circuit receives the actual velocity signal, the controlled stop signal and the absolute stop signal and produces a brake actuation signal having a value sufficient to partially engage the vehicle brake and a velocity command signal having a value sufficient to continue to propel the vehicle at a predetermined low velocity in response to receiving the controlled stop signal. The logic control device also produces a velocity command signal having a minimum value in response to receiving the absolute stop signal.

In a second aspect of the present invention, a method for controllably stopping a vehicle is provided. A logic control circuit produces a velocity command signal and a brake actuation signal in response to predetermined operating conditions. A vehicle drive circuit controllably propels the vehicle at a velocity responsive to the velocity command signal. A ground engaging wheel is equipped with a vehicle brake for controllably stopping the vehicle in response to the brake actuation signal. A transducer senses the vehicle velocity and responsively produces an actual velocity signal. The method includes the steps of producing a controlled stop signal in response to the vehicle being positioned a predetermined distance from a desired stop location, and producing the brake actuation signal having a value sufficient to partially engage the vehicle brake and the velocity command signal having a value sufficient to continue to propel the vehicle at a predetermined low velocity in response to the controlled stop signal. An absolute stop signal is produced in response to the vehicle being positioned at the desired stop location, and a velocity command signal having a minimum value is produced in response to the absolute stop signal.

The present invention provides an apparatus and method for controllably stopping a vehicle at a predetermined location. The apparatus and method is particularly advantageous in controllably stopping a driverless industrial vehicle operating on an uneven travel surface.

BRIEF DESCRIPTION OF THE DRAWINGS

For a better understanding of the present invention, reference may be made to the accompanying drawings, in which:

FIG. 6 is a flowchart of software used with one embodiment of the present invention.

BEST MODE FOR CARRYING OUT THE INVENTION

Figure 1:
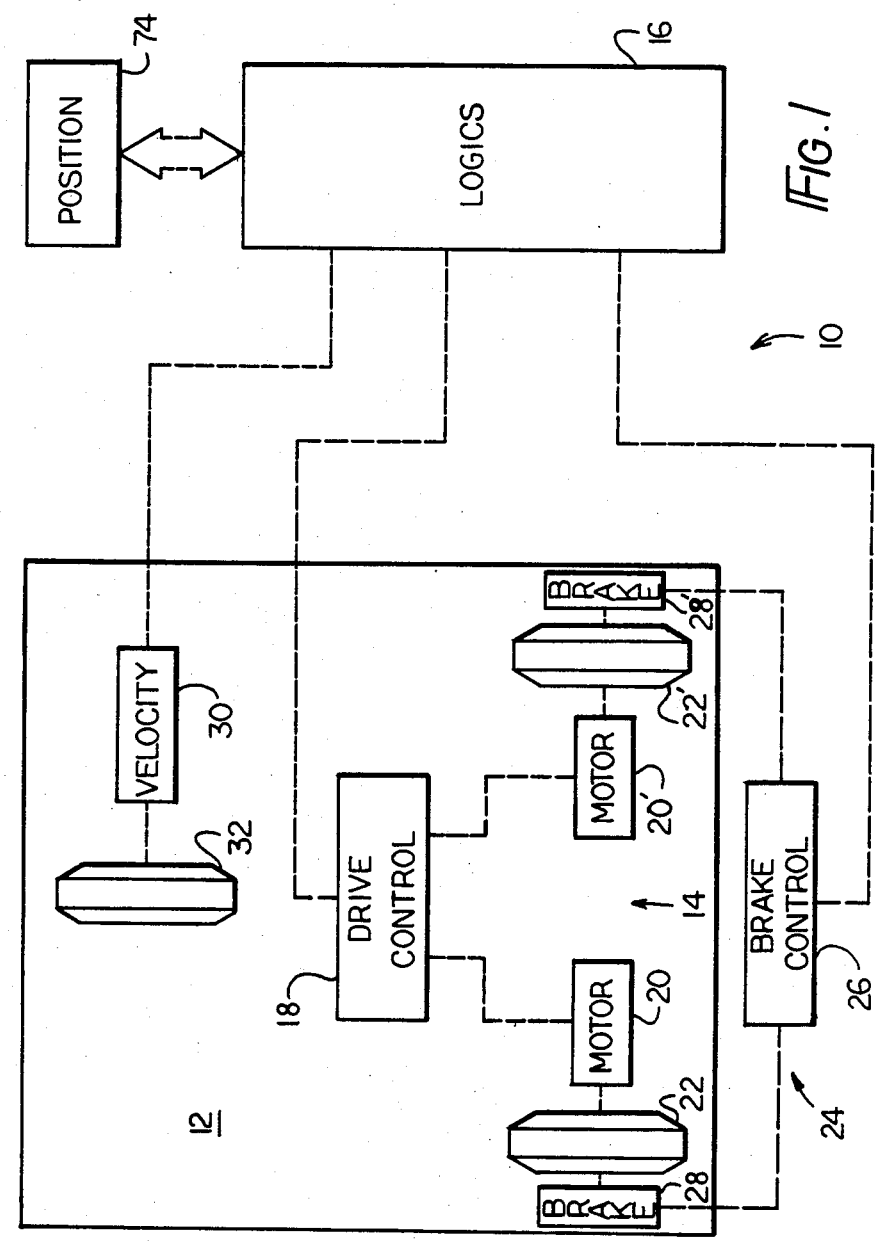
FIG. 1 is a block diagram of one embodiment of the present invention.
Figure 2:
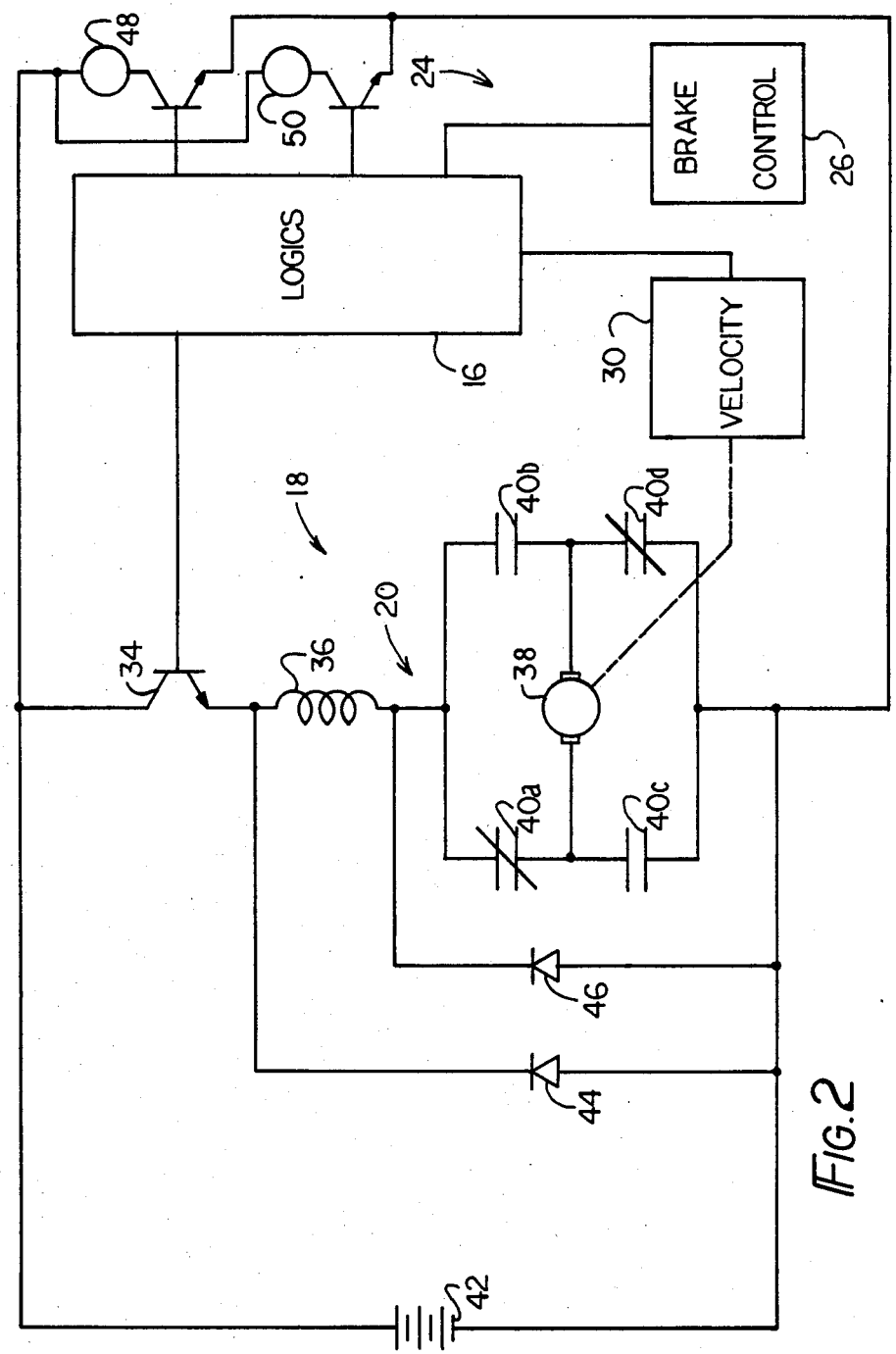
FIG. 2 is a schematic diagram of a drive circuit utilized in the embodiment of FIG. 1.
Figure 3:
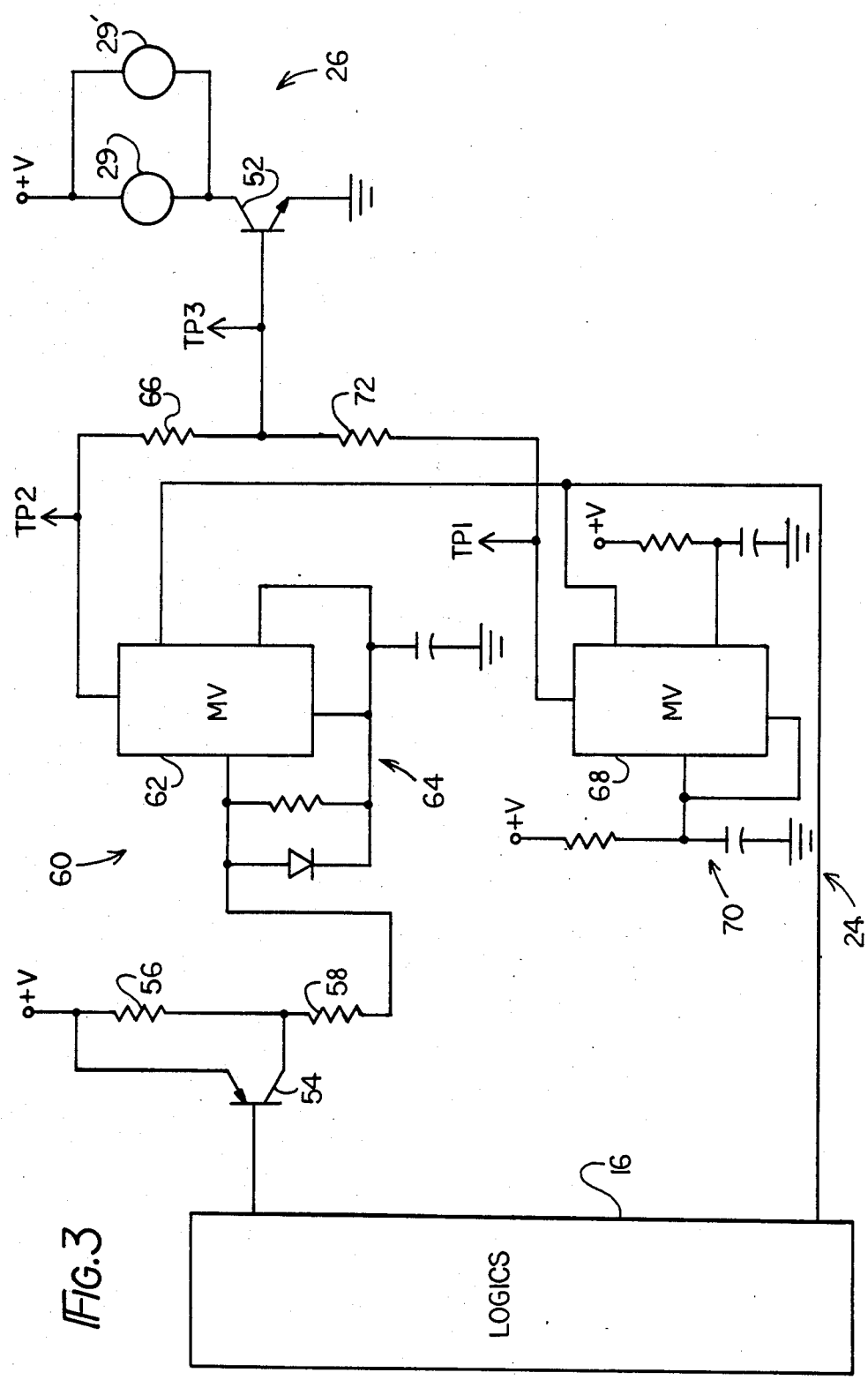
FIG. 3 is a schematic diagram of a brake actuation circuit utilized in the embodiment of FIG. 1.

Referring to the FIGS., and especially to FIGS. 1-3, an apparatus embodying certain of the principles of the present invention is generally indicated by the reference numeral 10. It should be understood that the following detailed description relates to the best presently-known embodiment of the apparatus 10. However, the apparatus 10 can assume numerous other embodiments, as will become apparent to those skilled in the art, without departing from the appended claims.

A vehicle 12 includes a drive means 14 for controllably propelling the vehicle 12 at a velocity responsive to a velocity command signal. The drive means 14 includes, for example, a logic control means 16 for producing the velocity command signal, a drive control 18, and one or more motors 20,20'. The vehicle 12 also includes one or more ground engaging wheels 22,22', and is equipped with a vehicle brake means 24 for controllably stopping the vehicle 12 in response to a brake actuation signal. The vehicle brake means 24 includes a brake control 26 and one or more vehicle brakes 28,28' each associated with a respective vehicle wheel 22,22'. Finally, a transducer means 30 is associated with at least one wheel 32 of the vehicle 12, preferably a nondriven idler wheel, and senses the vehicle velocity and responsively produces an actual velocity signal.

The vehicle drive means 14 is of conventional design and is illustrated in FIG. 2. In response to particular operating conditions, the logic control means 16 delivers an appropriate pulse width modulated velocity command signal to a transistor 34. The transistor 34 is the controlled element in a conventional chopper circuit, and, with appropriate circuit modifications, could be replaced with various other known switching devices.

The motor 20 includes a field winding 36 and an armature winding 38. The field winding 36 is serially connected between the transistor 34 and a set of direction contactors 40a-d. In response to the transistor 34 being biased "ON" by a particular velocity command pulse width modulated signal, current flows from a battery 40 through the transistor 34 and the field winding 36. Current then flows through one of the direction contactors 40a,40b, the armature winding 38, and the other of the direction contactors 40c,40d, and back to the battery 42. A flyback diode 44 is connected between the transistor switch 34 and the field winding 36, and a plugging diode 46 is connected between the field winding 36 and the direction contactors 40a-d. First and second contactor coils 48,50 are connected to the logic control means 16 and controllably operate respective ones of the direction contactors 40a-c in response to direction signals delivered by the logic control means 16 to respective switching transistors. In vehicles utilizing multiple drive motors 22,22', the basic drive circuit of FIG. 2 is substantially duplicated for each motor 22,22', as is known in the art.

The vehicle brakes 28,28' are preferably conventional electrical brakes having friction type pressure pads associated with friction discs connected to each braked wheel 22,22'. In the preferred embodiment, the brakes 28,28' are of the spring applied type. In other words, the brakes 28,28' are normally spring engaged, and must be actively released in order to operate the vehicle 12. Each brake 28,28' has associated with it a respective brake solenoid 29,29' which, upon sufficient energization, causes the brakes to release. Therefore, the brakes 28,28' are engaged by reducing the current flowing through the respective brake solenoids 29,29', and are disengaged by supplying sufficient current to the solenoids 29,29' to overcome the brake spring resistance.

A preferred embodiment of the vehicle brake means 24 is illustrated in FIG. 3. The logic control means 16 is connected to the base of a transistor 54. A resistor 56 is connected across the emitter and collector leads of the transistor 54, with the emitter lead also being connected to a positive power supply terminal. A resistor 58 is connected from the collector lead of the transistor 54 to a logic circuit 60. The logic circuit 60 includes an astable multivibrator 62. The multivibrator 62 includes a timing and trigger circuit 64 connected as is well-known in the art. A resistor 66 is connected to an output terminal of the multivibrator 62.

The logic circuit 60 also includes a monostable multivibrator 68, having a respective timing and trigger circuit 70. A resistor 72 is connected to an output terminal of the second multivibrator 68. The resistors 66,72 connected to the respective output terminals of the multivibrators 62,68 are connected together at the base terminal of an output transistor 52.

FIG. 1 also includes a position determining means 74 connected to the logic control means 16. The position determining means 74 produces a controlled stop signal in response to the vehicle 12 being positioned a predetermined distance from a desired stop location, and an absolute stop signal in response to the vehicle 12 being positioned at the desired stop location. The manner in which the position determining means 74 functions is not of particular concern with regard to the instant invention. The position determining means 74 can be as simple as a series of limit or photoelectric switches positioned at predetermined locations along the route of the vehicle 12, or as sophisticated as a true navigation and guidance system associated with the vehicle 12 and adapted to determine the relative position of the vehicle with respect to various docking locations in a particular facility. Such position determining devices are familiar to those skilled in the art. Regardless of the sophistication of the position determining means 74, the operation of the instant invention remains substantially the same.

The flowchart of FIG. 6 defines the internal programming for a preferred embodiment of the logic control means 16. From this flowchart, a programmer of ordinary skill can develop a specific set of program instructions that performs the steps necessary to implement the instant invention. It will be appreciated that, while the best mode of the invention is considered to include a properly programmed microprocessor, the result of which is the creation of novel hardware associations within the microprocessor and its peripheral devices, it is possible to implement the instant invention utilizing traditional hardwired circuits.

Beginning at the "START" block 100, the normal vehicle control portion of the flowchart proceeds down the left side of FIG. 6. In the block 102, the logic control means 16 tests for the presence of the controlled stop signal produced by the position determining means 74. Assuming that the signal is not present, program control progresses to the block 104 where normal vehicle operation continues. The general control processes of the block 104 do not form part of the instant invention and are not discussed in detail herein. These control functions include typical aspects of vehicle control such as acceleration, guidance, speed control, navigation, and auxiliary functions. Periodically, the program loops through the block 102 where the controlled stop signal inquiry is made.

Figure 4:
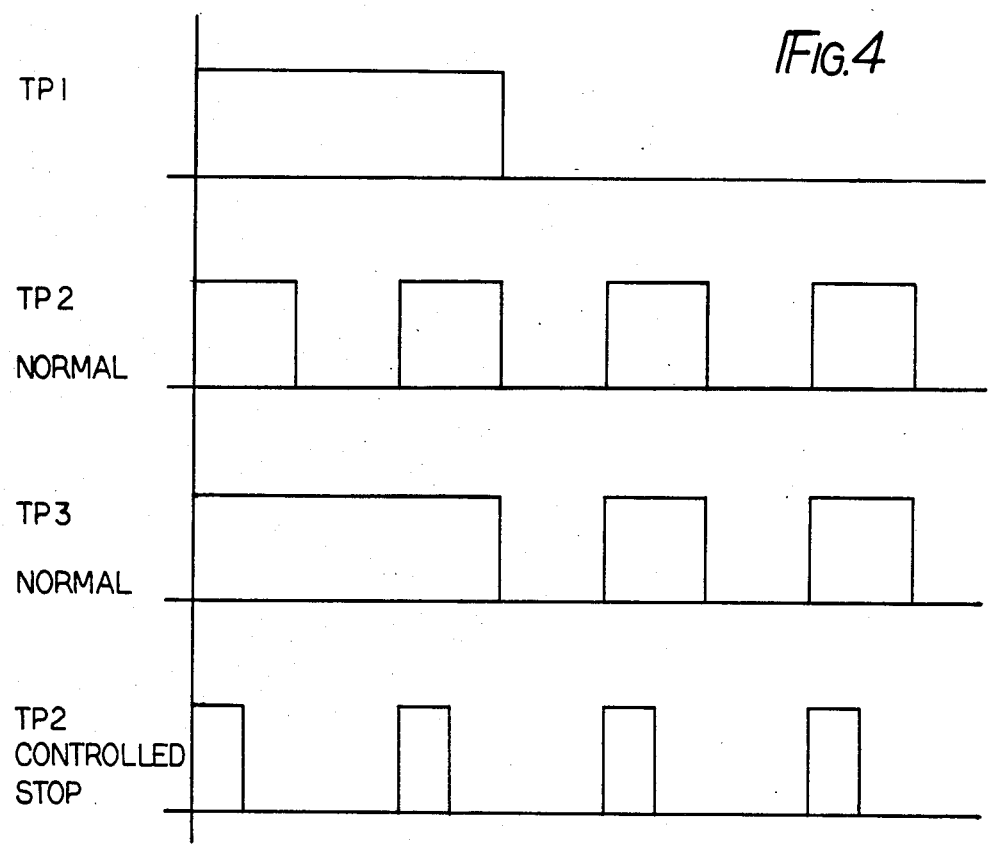
FIG. 4 is a plurality of waveforms associated with and useful in understanding the embodiment of FIG. 1.

The one aspect of normal vehicle control that is of interest in the present invention is control of the vehicle brakes 28,28'. Under normal operating conditions, the vehicle control means 16 delivers a predetermined brake effort signal to the transistor 54. This normal brake effort signal maintains the transistor 54 biased "OFF". Responsively, the astable multivibrator 62 produces a brake actuation signal having a duty cycle responsive to the combined resistance of the series resistors 56,58. This pulse duty cycle is depicted in FIG. 4 at TP2-(NORMAL), and is delivered through the resistor 66 to the drive transistor 52.

At each initial start up from a stopped condition, the logic control means 16 also causes the monostable multivibrator 68 to produce a single pulse having a duration responsive to the timing and trigger circuit 70. The single pulse produced by the monostable multivibrator 68 is of a longer duration than any of the individual pulses produced by the astable multivibrator 62, and is depicted in FIG. 4 at TP1. This pulse is delivered through the resistor 72, where it is summed with the duty cycle pulses delivered through the resistor 66 and the combined result is delivered to the input terminal of the drive transistor 52.

The vehicle brake 28,28' requires a predetermined solenoid coil current to initially overcome the brake spring forces. The relatively long duration pulse delivered at TP1 is sufficient to overcome the initial resistance of the brake springs. Once the vehicle brakes 28,28' are initially retracted, a much smaller current flowing through the brake solenoid coils 29,29' is sufficient to maintain the vehicle brakes 28,28' in the released position. Therefore, the reduced duty cycle pulses delivered by the astable multivibrator 62 are sufficient to maintain this released condition. The use of the lower duty cycle pulse train to maintain the brakes 28,28' in the released position is advantageous in conserving power provided by the battery 42 and reducing heating in the brake solenoid coils 29,29'. Therefore, in the normal mode of operation, the brakes 28,28' are maintained in the released position by the continuous supply of the predetermined pulse duty cycle from the astable multivibrator 62 delivered to the drive transistor 52.

Upon detecting the presence of the controlled stop signal in the block 102, program control passes to the block 106 where the vehicle brake means 24 is partially engaged. The logic control means 16 delivers a brake effort signal to the transistor 54 sufficient to bias the transistor 54 "ON". Responsively, the resistor 56 is effectively removed from the timing and trigger circuit 64 and the duty cycle of the pulses produced by the astable multivibrator 62 is responsive only to the remaining resistor 58. Owing to the decreased time constant of the timing and trigger circuit 64, the produced duty cycle has a reduced "ON" time. This reduced duty cycle is illustrated in FIG. 4 at the waveform labeled TP2-(CONTROLLED STOP).

The reduced duty cycle is insufficient to maintain the brakes 28,28' in the fully released position, but is sufficient to prevent the brakes 28,28' from becoming fully engaged. Therefore, the brakes 28,28' are partially engaged and cause the associated wheels 22,22' to drag, i.e., to provide a controlled predetermined rolling resistance to the vehicle 12.

Subsequent to partially engaging the brakes 28,28' in the block 106, program control passes to the block 108 where the vehicle drive means 14 is pulsed to maintain a low velocity. The vehicle control means 16 delivers a velocity command signal to the transistor 34 sufficient to cause the motors 20,20' to overcome the brake resistance and to propel the vehicle 12 at a relatively low velocity. The signal received from the velocity transducer means 30 is used by the logic control means 16 to monitor the actual velocity of the vehicle 12.

Figure 5:
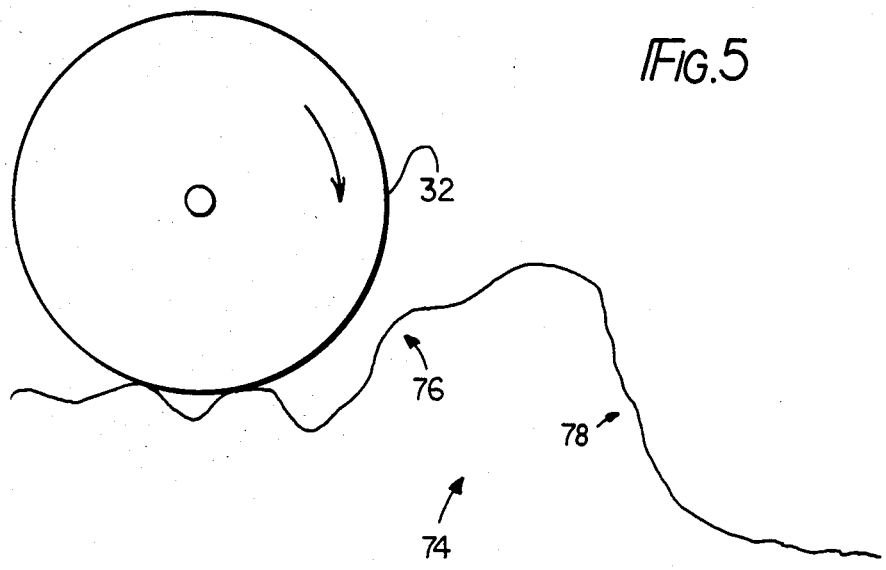
FIG. 5 is an exaggerated representation of a portion of a surface over which a vehicle must travel.

Therefore, once program control has progressed to the block 108, the vehicle 12 continues to proceed toward the desired stop location at a low velocity with the brakes 28,28' partially engaged. The effect of this mode of operation is illustrated in FIG. 5, in which an exaggerated portion of a floor or other surface 74 over which the vehicle 12 is traversing is illustrated.

The wheel 32 is, for example, the idler wheel 32 of the vehicle 12. The vehicle drive means 14 encounters no difficulty in maintaining a constant vehicle velocity while the wheel 32 travels up a rising surface portion 76, owing to the ability of the drive means 14 to virtually instantaneously increase the pulse duty cycle delivered to the motors 20,20' sufficiently to maintain the desired vehicle velocity.

However, upon reaching the downward sloping portion 78 of the surface 74, gravity tends to rapidly increase the speed of the vehicle 12 beyond the desired velocity. Without utilizing the instant apparatus for controllably stopping the vehicle 12, conventional vehicle control systems are often unable to maintain the desired vehicle velocity on the downward sloping portion 78, and the vehicle 12 can overshoot the desired stop location. However, in the instant embodiment, the vehicle drive means 14 merely reduces the pulse duty cycle being delivered to the motors 20,20' and the partially engaged brakes 28,28' instantaneously limit the velocity of the vehicle 12 on the downward sloping portion 78. In other words, regardless of the slope of the terrain over which the vehicle 12 is traversing, continuously accurate vehicle velocity can be maintained by merely varying the duty cycle of the pulse trains delivered to the drive circuit 14. Such accurate and virtually instantaneous control over vehicle velocity permits the vehicle 12 to slowly approach the desired stop location at a carefully maintained velocity.

Upon reaching the desired stop location, the position determining means 74 produces the absolute stop signal. This signal is detected in the block 110 and control progresses to the block 112 where the vehicle drive means 14 stops pulsing the motors 20,20' completely. Owing to the partially engaged brakes 28,28', the vehicle 12 stops virtually instantaneously precisely at the predetermined desired stop location. No delays in controlling the position at which the vehicle 12 stops are encountered as is typically the case where the vehicle brakes must be applied after sensing the desired stop position.

Subsequent to the vehicle actually stopping, program control passes to the block 114 where the brakes 28,28' are fully engaged by deenergizing the brake solenoids 29,29' in response to a reset signal delivered from the logic control means 16 to the multivibrators 62,68. The spring applied brakes 28,28' are thus fully engaged and maintain the vehicle 12 in the stopped position. Program control then returns to the main program where normal control processes proceed.

INDUSTRIAL APPLICABILITY

Operation of the apparatus 10 is best described in relation to its use on a vehicle, for example, an industrial vehicle 12 such as an automatic guided transport or lift truck. Assuming that the vehicle 12 is starting initially from a stopped position, the initial brake release pulse is delivered from the monostable multivibrator 68 to the brake control 26. Responsively, the brakes 28,28' are retracted to the fully released position. Subsequently, the brakes 28,28' are maintained in the fully retracted position by the reduced pulse duty cycle signal delivered from the astable multivibrator 62. The vehicle 12 is then controlled in a normal manner as is known in the art. Acceleration and speed control of the vehicle 12 is maintained by the velocity command signal delivered to the vehicle drive means 14 from the logic control means 16.

Normal braking of the vehicle 12 is provided by a combination of electrical braking and auxiliary wheel braking. For example, electrical braking is performed when the vehicle 12 is moving, in response to the logic control means 16 delivering signals to the contactor coils 48,50 sufficient to reverse the orientation of the direction contactors 40a-d. Responsively, the vehicle 12 enters a plugging mode, as is well-known in the art, whereby electrical braking is accomplished through the effort of the motors 20,20'. The level of plugging is controlled by the duty cycle of the pulses delivered to the motors 20,20' via the vehicle drive means 14. Should auxiliary braking be required, the logic control means 16 has the capability of fully engaging the vehicle brakes 28,28' by inhibiting the pulses produced by the multivibrators 62,68.

In response to the position determining means 74 producing a controlled stop signal when the vehicle 12 is within a predetermined distance from a desired stop location, the logic control means 16 delivers a brake effort signal to the transistor 54 sufficient to reduce the pulse duty cycle delivered by the astable multivibrator 62 to the brake control means 26, thereby reducing the brake hold-off effort of the brake solenoids 29,29' and allowing the brakes 28,28' to become partially engaged. Coincidentally, the logic control means 16 delivers a velocity command signal to the vehicle drive means 14 sufficient to maintain the velocity of the vehicle 12 at a predetermined relatively low velocity.

The position determining means 74 then produces an absolute stop signal in response to the vehicle 12 being positioned at the desired stop location. Responsively, the logic control means 16 delivers the the velocity command signal to the vehicle drive means 14 causing the motors 20,20' to fully turn "OFF", stopping the vehicle 12 immediately. Therefore, accurate and absolute control is maintained over the approach of the vehicle 12 to the desired stop location, and the vehicle 12 is responsively stopped precisely at the desired location without disadvantageous effects caused by irregularities in the surface over which the vehicle 12 must travel.

Other aspects, objects, advantages and uses of this invention can be obtained from a study of the drawings, the disclosure, and the appended claims.

I claim:

1. Apparatus for controllably stopping a vehicle, said vehicle having a vehicle drive means for controllably propelling said vehicle at a velocity responsive to a velocity command signal, at least one ground engaging wheel equipped with a respective vehicle brake adapted to controllably stop said vehicle in response to brake actuation signals, and a transducer means for sensing said vehicle velocity and responsively producing an actual velocity signal, comprising:

a logic control means for producing said velocity command signal and said brake actuation signal in response to predetermined operating conditions;

position determining means for producing a controlled stop signal in response to said vehicle being positioned a predetermined distance from a desired stop location, and an absolute stop signal in response to said vehicle being positioned at said desired stop location; and wherein said logic control means receives said actual velocity signal, said controlled stop signal and said absolute stop signal, produces said brake actuation signal having a value sufficient to partially engage said vehicle brake and said velocity command signal having a value sufficient to continue to propel said vehicle at a predetermined low velocity in response to receiving said controlled stop signal, and produces said velocity command signal having a minimum value in response to receiving said absolute stop signal.

2. Apparatus, as set forth in claim 1, wherein said vehicle brake is electrically actuated.

3. Apparatus, as set forth in claim 2, wherein said logic control means produces a brake effort command signal, and includes a brake control means for producing said brake actuation signals in response to said brake effort command signal, said brake actuation signals being a pulse signal having a pulse cycle variably responsive to said brake effort command signal.

4. Apparatus, as set forth in claim 3, wherein said brake control means produces a first brake actuation signal having a relatively long pulse duty cycle in response to said brake effort signal having a magnitude in a first predetermined range, and a second brake actuation signal having a relatively short pulse duty cycle in response to said brake effort signal having a magnitude in a second predetermined range.

5. A method for controllably stopping a vehicle, said vehicle having a logic control means for producing a velocity command signal and a brake actuation signal in response to predetermined operating conditions, a vehicle drive means for controllably propelling said vehicle at a velocity responsive to said velocity command signal, at least one ground engaging wheel equipped with a respective vehicle brake adapted to for controllably stop said vehicle in response to said brake actuation signal, and a transducer means for sensing said vehicle velocity and responsively producing an actual velocity signal, comprising the steps of:

producing a controlled stop signal in response to said vehicle being positioned a predetermined distance from a desired stop location;

producing said brake actuation signal having a magnitude sufficient to partially engage said vehicle brake and said velocity command signal having a value sufficient to continue to propel said vehicle at a predetermined low velocity in response to said controlled stop signal;

producing an absolute stop signal in response to said vehicle being positioned at said desired stop location; and producing said velocity command signal having a minimum value in response to said absolute stop signal.

* * * * *